United States Patent
Li et al.

(10) Patent No.: US 10,495,925 B2
(45) Date of Patent: Dec. 3, 2019

(54) BACKLIGHT MODULE AND DISPLAY DEVICE

(71) Applicant: HUIZHOU CHINA STAR OPTOELECTRONICS TECHNOLOGY CO., LTD., Huizhou, Guangdong (CN)

(72) Inventors: Dehua Li, Huizhou Guangdong (CN); Gang Yu, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 15/909,441

(22) Filed: Mar. 1, 2018

(65) Prior Publication Data
US 2019/0204683 A1    Jul. 4, 2019

Related U.S. Application Data

(63) Continuation of application No. PCT/CN2018/073278, filed on Jan. 18, 2018.

(30) Foreign Application Priority Data

Dec. 28, 2017 (CN) .......................... 2017 1 1465284

(51) Int. Cl.
*G02F 1/1335* (2006.01)
*G02F 1/1362* (2006.01)
(Continued)

(52) U.S. Cl.
CPC ......... *G02F 1/133603* (2013.01); *G02B 6/00* (2013.01); *G02F 1/133615* (2013.01); *G02F 1/136204* (2013.01); *G02F 2001/3505* (2013.01)

(58) Field of Classification Search
CPC ......... G02F 1/133603; G02F 1/133615; G02F 2001/133317
See application file for complete search history.

(56) References Cited

U.S. PATENT DOCUMENTS

2008/0043171 A1* 2/2008 Takahashi ............ G02B 6/0083
                                                        349/65
2008/0170179 A1* 7/2008 Shiraishi .............. G02B 6/0055
                                                        349/65
(Continued)

FOREIGN PATENT DOCUMENTS

CN   101377589 A   3/2009
CN   101520574 A   9/2009
(Continued)

*Primary Examiner* — Thanh Nhan P Nguyen
(74) *Attorney, Agent, or Firm* — Hemisphere Law, PLLC; Zhigang Ma

(57) ABSTRACT

The disclosure provides a backlight module includes a light guide plate and a light source device configured to provide light to the light guide plate. The light source device includes a circuit board and a LED lamp electrically connected to the circuit board. The LED lamp is external to the light guide plate and at a lateral surface of the light guide plate. The circuit board is parallel to the light guide plate with a portion pressed on another lateral surface of the light guide plate. The disclosure provides a display device includes a frame and a liquid crystal display screen and the backlight module installed on the frame. The reflective film and the circuit board share a part of room for thickness, so the thickness of the backlight module is reduced and the module is thinned.

10 Claims, 2 Drawing Sheets

(51) Int. Cl.
*G02B 6/00* (2006.01)
*G02F 1/35* (2006.01)

(56) References Cited

U.S. PATENT DOCUMENTS

| | | | | |
|---|---|---|---|---|
| 2011/0007242 A1* | 1/2011 | Lee | ............... | G02F 1/133608 |
| | | | | 349/65 |
| 2011/0025949 A1* | 2/2011 | Park | ............... | G02B 6/0018 |
| | | | | 349/64 |
| 2014/0029298 A1* | 1/2014 | Hyun | ............... | G02B 6/0003 |
| | | | | 362/608 |
| 2015/0138472 A1* | 5/2015 | Yu | ............... | G02B 6/0073 |
| | | | | 349/43 |
| 2016/0291393 A1 | 10/2016 | Han et al. | | |

FOREIGN PATENT DOCUMENTS

| | | |
|---|---|---|
| CN | 103439833 A | 12/2013 |
| CN | 104913243 A | 9/2015 |
| CN | 105044981 A | 11/2015 |
| CN | 105116606 A | 12/2015 |
| CN | 105824151 A | 8/2016 |
| CN | 105842912 A | 8/2016 |

* cited by examiner

BACKLIGHT MODULE AND DISPLAY DEVICE

RELATED APPLICATIONS

The present application is a National Phase of International Application Number PCT/CN2018/073278, filed Jan. 18, 2018, and claims the priority of China Application No. 201711465284.1, filed Dec. 28, 2017.

FIELD OF THE DISCLOSURE

The disclosure relates to a liquid crystal display technique, and particularly to a backlight module and display device.

BACKGROUND

Nowadays, the liquid crystal display device is broadly used in a variety of electronic products as a display component. As the size and the weight of the electronic products is getting reduced, the rim of the electronic apparatus is getting narrower. The backlight module is an important component of the liquid crystal display device, so the rim of the backlight module should be getting narrower.

As shown in FIG. 1, the conventional display device 10 includes a light guide plate 11, a light bar 12 and a back plate 13. Because the printed circuit board of the light bar 12 has a certain width and occupies a certain thickness in the incident side of the backlight module, the back plate has to extend beyond the edge of the backlight module to provide a space for the light source.

SUMMARY

The disclosure is to provide a backlight module and a display device to overcome the deficiency of the conventional art.

To realize the aforementioned purpose, the disclosure provides the following technical solutions:

One embodiment of the disclosure provides a backlight module includes a light guide plate and a light source device configured to provide light to the light guide plate. The light source device includes a circuit board and a light emitting diode (LED) lamp electrically connected to the circuit board. The LED lamp is located at an outer side of a lateral surface of the light guide plate. The circuit board is parallel to the light guide plate with a portion pressed on another lateral surface of the light guide plate.

In one embodiment, the backlight module further comprises an optical film and a reflective film formed at two opposite sides of the light guide plate, wherein a ladder structure is formed between an edge of the optical film and a surface of the light guide plate, and part of the circuit board extends to the ladder structure and presses the surface of the light guide plate.

In one embodiment, the backlight module further comprises a back plate covering outer sides of the reflective film, wherein there is a double-sided thermal adhesive between the circuit board and the back plate.

In one embodiment, in the backlight module, there is a gap cavity between the double-sided thermal adhesive and the lateral surface of the of the light guide plate, and the LED lamp is in the gap cavity.

The disclosure also provides a display device comprises a frame, a liquid crystal display (LCD) screen and the backlight module both installed on the frame.

In one embodiment, in the display device, there is a thermal insulation pad sandwiched between the LCD screen and a surface of the circuit board away from the light guide plate.

In the display device, there is a briquetting between the frame and a surface of the circuit board away from the back plate In one embodiment the display device further comprises a back plate covering outer sides of the reflective film, wherein there is a double-sided thermal adhesive between the circuit board and the back plate. The briquetting and the double-sided thermal adhesive are corresponding to two opposite sides of the circuit board In one embodiment, in the display device, the frame comprises a front frame pressing a front surface of the LCD screen and a mid-frame supporting a lateral edge of the LCD screen.

Compared with the conventional art, the advantage of the disclosure is that the reflective film and the circuit board share a part of room for thickness, so the back plate is flat at the incident side of the backlight module and not extending beyond the edge of the backlight module. The exterior of the backlight module is improved and the module is thinned.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments.

In the disclosure, it should be noted that the terms such as central, above, under, left, right, perpendicular, horizontal, inner, outer, and etc. are for briefly illustrating the direction or relationship between positions based on the drawings. The disclosure does not intend to limit the operation or the structure of the mentioned devices or elements thereto. Further, the terms such as first, second, third, and etc. are for illustrating purpose, so they should not be interpreted as the indication or hint of the sequence of importance.

In the description of the disclosure, it should be illustrated that the terms such as installed, connected mutually, connected, and etc., unless additionally limited, should be broadest interpreted. For example, "connected to" may be fixedly connected to, pluggably connected to, or integrally connected to; it also may be mechanically connected to or electrically connected to; it also may be directly connected to, connected to via intermedia, or inner connected to. The person having ordinary skill in the art is capable of understanding the meaning of the disclosure explicitly.

Figure 1:
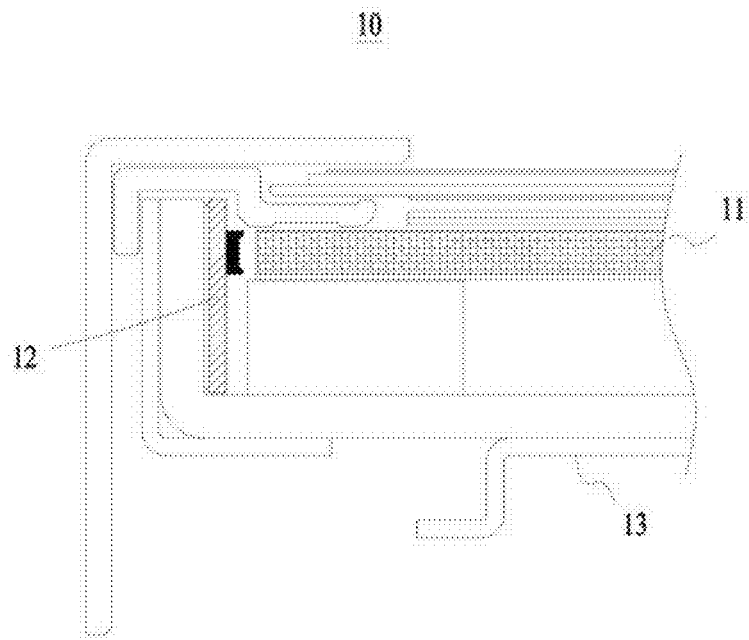
FIG. 1 is a partial intersectional view of a conventional display device.
Figure 2:
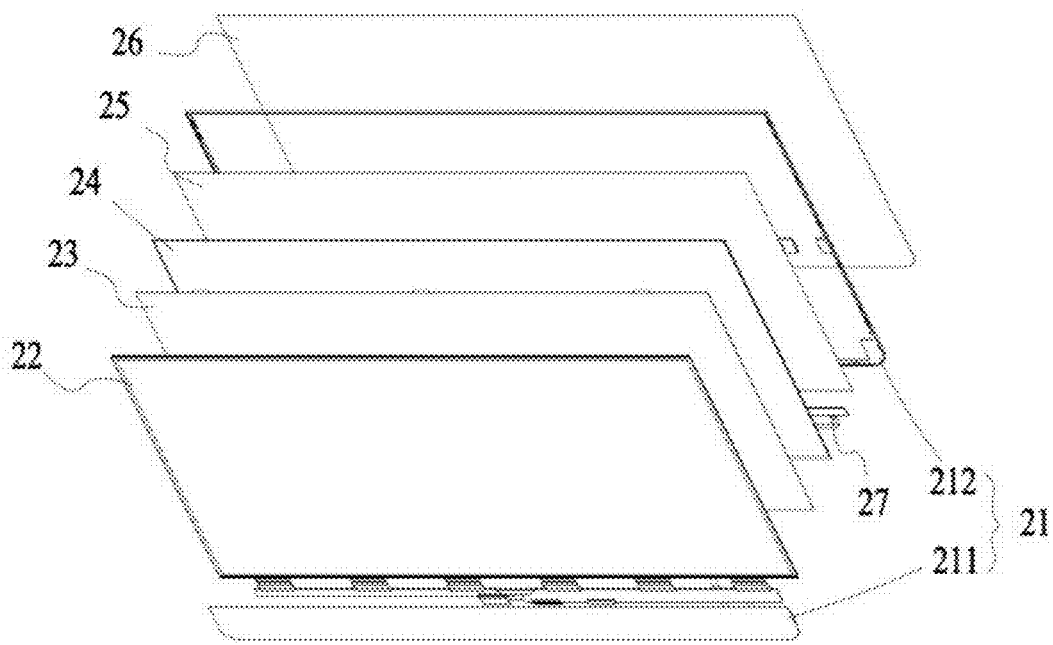
FIG. 2 is a three-dimensional decomposition diagram of the display device in an exemplary embodiment of the disclosure.
Figure 3:
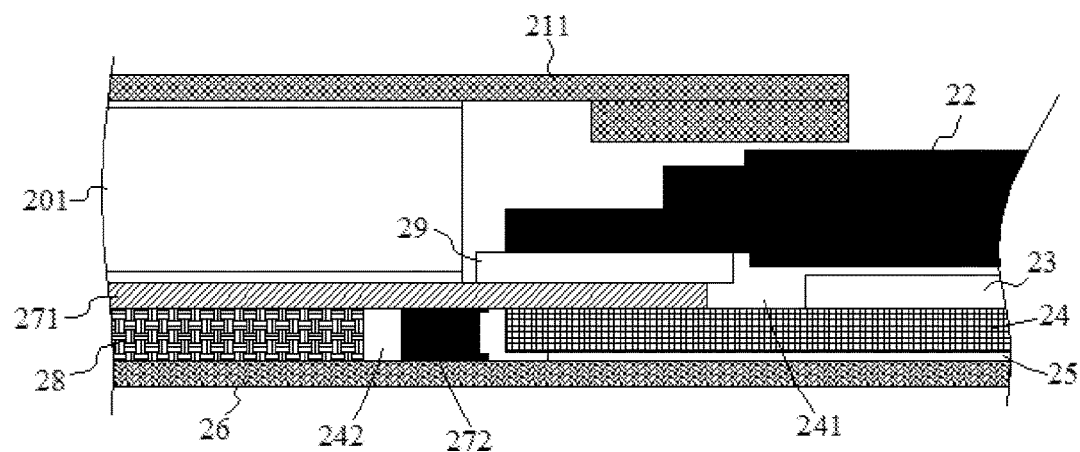
FIG. 3 is a partial intersectional view of a display device in one embodiment of the disclosure.
Figure 4:
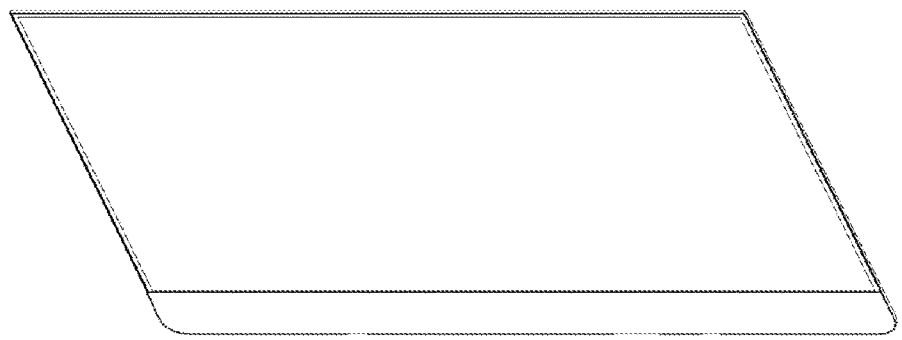
FIG. 4 is a three-dimensional structure diagram of the assembled display device in one embodiment of the disclosure.

As shown in FIG. 2 to FIG. 4, a display device 20 includes a frame 21, and the elements supported by the frame 21 such as a LCD screen 22, an optical film 23, a light guide plate 24, a reflective film 25, a back plate 26, and a light source device 27.

The reflective film 25, the light guide plate 24, the optical film 23, and the LCD screen 22 are sequentially stack on the surface of the back plate 26.

The frame 21 includes a front frame 211 pressing the front surface of the LCD screen 22 and a mid-frame 212 supporting the lateral edge of the LCD screen 22.

In one embodiment, an area of the optical film 23 is less than an area of the light guide plate 24, and a ladder structure 241 is therefore formed by the edge of the optical film 23 and the light guide plate 24.

The light source device 27 is configured to provide light to the light guide plate 24. The light source device 27 includes a circuit board 271 and a LED lamp 272 electrically connected to the circuit board 271. The LED lamp 272 is formed at an outer side of the lateral surface of the light guide plate 24. The circuit board 271 is parallel to the light guide plate 24 with a portion pressed on at one lateral surface of the light guide plate 24.

In advance, one end of the circuit board 271 close to the light guide plate 24 extends to the ladder structure 241 and presses on the surface of the light guide plate 24.

In the embodiment, the circuit board 271 and the optical film 23 share a part of the room in thickness, so the back plate is flat at the incident side of the backlight module and not extending beyond the edge of the backlight module. The exterior of the backlight module is improved and the module is thinned.

In another embodiment, the circuit board and the reflective film are both at the same side of light guide plate. Explicitly, a ladder structure is formed by the edge of the reflective film and the surface of the light guide plate. An end of the circuit board extends to the ladder structure and fit the surface of the light guide plate, the reflective film and the circuit board share a part of room for thickness, so the thickness of the backlight module is reduced and the module is thinned.

In one embodiment, the light source device has a plurality of light emitting diodes as the point light source array on a surface of the printed circuit board (PCB) and form an LED light bar. A plurality of LEDs are driven by the PCB to emit light so as to form line-shape light source. The light guide plate (LGP) of the backlight module then change the emitting direction of the light so as to have an even plate light source.

In one embodiment, there is double-sided thermal adhesive 28 between the back plate 26 and an end of the circuit board 27 away from the light guide plate 24 for fastening.

In advance, a gap cavity 242 is formed between the double-sided thermal adhesive 28 and the lateral surface of the light guide plate 24, and the LED lamp 272 is in the gap cavity 242.

In the technical solution, the circuit board is fixed on the back plate via the double-sided thermal adhesive. In one way, the thermal conduction of the circuit board is realized. In the other way, the circuit board and the back plate is fixed relatively. Additionally, there is a clip mouth formed between the circuit board and the back plate configured to clamp fixing the non-emitting surface of the light guide plate.

In one embodiment, the double-sided thermal adhesive is produced by mixing the organic silicon adhesive and the Acrylic polymer filled with thermal ceramic powder. The double-sided thermal adhesive has the characteristic of high thermal conductivity and insulation as well as flexibility, compressibility, and strong sticky. The double-sided thermal adhesive is applicable in a large range of temperature and capable of filling the uneven surface, strongly fixing the heat source device and the heat sink to transfer thermal quickly.

In the disclosure, the circuit board presses the surface of the light guide plate so as to fix the light guide plate. In one embodiment, the contacting region between the circuit board and the light guide plate can be glued. In another embodiment, the circuit board only removable presses on the surface of the light guide plate.

In advance, there is a thermal insulation pad 29 sandwiched between the surface of the circuit board 271 away from the light guide plate 24 and the LCD screen 22.

In the technical solution, the thermal insulation pad is between the circuit board and the LCD screen. In one way, the heat conduction between the light source device and the LCD screen is prevented. In the other way, the thermal insulation pad acts as a supporting element so as to fix the LCD screen relative to the circuit board.

In the embodiment, the thermal insulation element is corresponding to the non-emitting surface of the light guide plate, so the thermal insulation element does not block the emitted light of the light guide plate.

It should be noted that the thermal insulation element in the disclosure does not increase the distance between the LCD screen and the light guide plate but make full use of the gap therebetween.

In advance, there is a briquetting between the front frame 211 and a surface of the circuit board 271 away from the back plate 26.

In the technical solution, a part of the back surface of the circuit board is supporting the light guide plate and another part of the back surface of the circuit board is fixed on the back plate via double-sided thermal adhesive. The front surface of the circuit board is fixed relative to the frame via the briquetting, so the consistency of the circuit board is guaranteed. The circuit board is fixed and the heat dissipating of the light source is enhanced.

In one embodiment, the optical film is fixed on the LCD screen by a double-sided adhesive.

In the disclosure, the optical film 23 is diffusion sheet, a prism sheet, a polarizer, or other functional optical films.

As above, the reflective film and the circuit board in the disclosure share a part of room for thickness, so the back plate is flat at the incident side of the backlight module and not extending beyond the edge of the backlight module. The exterior of the backlight module is improved and the module is thinned.

What is claimed is:

1. A backlight module, comprising:
    a light guide plate;
    a light source device configured to provide light to the light guide plate;
    an optical film and a reflective film formed at two opposite sides of the light guide plate; and
    a back plate covering outer sides of the reflective film;
    wherein the light source device comprises a circuit board parallel to the light guide plate with a portion pressed directly on an upper surface of the light guide plate, and an LED lamp electrically connected to the circuit board and located at an outer side of a lateral surface of the light guide plate;

wherein a ladder structure is formed between an edge of the optical film and a surface of the light guide plate, and part of the circuit board extends to the ladder structure and presses the surface of the light guide plate;

wherein a double-sided thermal adhesive is sandwiched between the circuit board and the back plate, and a gap cavity is formed between the double-sided thermal adhesive and the lateral surface of the light guide plate, and the LED lamp is disposed in the gap cavity.

2. The backlight module in claim 1, wherein the double-sided thermal adhesive is produced by mixing organic silicon adhesive and acrylic polymer filled with thermal ceramic powder.

3. A display device, comprising:
a frame; and
an LCD screen and a backlight module installed on the frame;
wherein the backlight module comprises:
a light guide plate;
a light source device configured to provide light to the light guide plate;
an optical film and a reflective film formed at two opposite sides of the light guide plate; and
a back plate covering outer sides of the reflective film;
wherein the light source device comprises a circuit board parallel to the light guide plate with a portion presses directly on an upper surface of the light guide plate, and an LED lamp electrically connected to the circuit board and located at an outer side of a lateral surface of the light guide plate;
wherein a ladder structure is formed between an edge of the optical film and a surface of the light guide plate, and part of the circuit board extends to the ladder structure and presses the surface of the light guide plate;

wherein a double-sided thermal adhesive is sandwiched between the circuit board and the back plate, and a gap cavity is formed between the double-sided thermal adhesive and the lateral surface of the light guide plate, and the LED lamp is disposed in the gap cavity.

4. The display device in claim 3, wherein the double-sided thermal adhesive is produced by mixing organic silicon adhesive and acrylic polymer filled with thermal ceramic powder.

5. The display device in claim 3, wherein a briquetting is further provided between the frame and a surface of the circuit board away from the back plate.

6. The display device in claim 5, wherein the briquetting and the double-sided thermal adhesive are corresponding to two opposite sides of the circuit board, respectively.

7. The display device in claim 6, wherein a gap cavity is formed between the double-sided thermal adhesive and the lateral surface of the light guide plate, and the LED lamp is disposed in the gap cavity.

8. The display device in claim 6, wherein the double-sided thermal adhesive is produced by mixing organic silicon adhesive and Acrylic polymer filled with thermal ceramic powder.

9. The display device in claim 3, wherein a thermal insulation pad is sandwiched between the LCD screen and a surface of the circuit board away from the light guide plate.

10. The display device in claim 3, wherein the frame comprises a front frame pressing a front surface of the LCD screen and a mid-frame supporting a lateral edge of the LCD screen.

* * * * *